United States Patent [19]

Barrett et al.

[11] Patent Number: 6,068,864
[45] Date of Patent: *May 30, 2000

[54] METHOD OF IMPARTING RESISTANCE TO MOISTURE AND TEXTURE DEGRADATION TO A BAKED PRODUCT

[75] Inventors: Mark R. Barrett, Madison, Wis.; Stuart A. Cochran, Tarrytown, N.Y.; Steven J. Goll, McFarland, Wis.

[73] Assignee: Kraft Foods, Inc., Northfield, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/678,905

[22] Filed: Jul. 12, 1996

[51] Int. Cl.⁷ ..................................................... A21D 15/00
[52] U.S. Cl. ........................... 426/20; 426/106; 426/112; 426/115; 426/119; 426/120; 426/128; 426/549; 426/392; 426/393; 426/394; 426/496
[58] Field of Search ............................... 426/120, 19, 20, 426/549, 106, 112, 115, 119, 128, 392, 393, 394, 496; 206/542

[56] References Cited

U.S. PATENT DOCUMENTS

| | | | |
|---|---|---|---|
| 2,615,810 | 10/1952 | Stone | 426/20 |
| 4,160,848 | 7/1979 | Vidal et al. | 426/20 X |
| 4,299,848 | 11/1981 | De Stefanis et al. | 426/20 |
| 4,320,151 | 3/1982 | Cole | 426/20 X |
| 4,416,903 | 11/1983 | Cole | 426/20 X |
| 4,654,216 | 3/1987 | Carroll et al. | 426/20 |
| 4,813,543 | 3/1989 | Goldberg | 426/128 X |
| 4,879,125 | 11/1989 | Pak | 426/120 |
| 4,990,343 | 2/1991 | Haarasilta et al. | 426/20 X |
| 5,023,094 | 6/1991 | Van Eijk | 426/20 |
| 5,059,430 | 10/1991 | Bowles | 426/20 |
| 5,119,940 | 6/1992 | Grindrod | 426/119 X |
| 5,123,527 | 6/1992 | Hustad et al. | 426/119 X |
| 5,176,927 | 1/1993 | Haarasilta et al. | 426/20 |
| 5,209,938 | 5/1993 | Kraus et al. | 426/20 |
| 5,375,701 | 12/1994 | Hustad et al. | 206/45.18 |
| 5,409,717 | 4/1995 | Apicella et al. | 426/19 |
| 5,421,510 | 6/1995 | Calvert | 229/125.35 |
| 5,472,724 | 12/1995 | Williams et al. | 426/497 |
| 5,562,937 | 10/1996 | Senkeleski et al. | 426/549 X |
| 5,747,084 | 5/1998 | Cochran et al. | 426/119 X |

FOREIGN PATENT DOCUMENTS 2210579 6/1989 United Kingdom .

OTHER PUBLICATIONS

Platt, *Cereal Chemistry*, vol. VII, No. 1, pp. 1,8, Jan. 1930.
Stear,*Handbook of Breadmaking Technology*, Chap. 3.6, pp. 679,682, 1990, Elsevier Science Publishing Co., Inc.

*Primary Examiner*—Milton Cano
*Attorney, Agent, or Firm*—Cook, Alex, McFarron, Manzo, Cummings & Mehler, Ltd.

[57] ABSTRACT

A method of imparting resistance to moisture and texture degradation in a baked dough bread roll made from a dough formulation including a starch-degrading, bacterially derived amylase enzyme, typically in combination with one or more of gluten, gum and egg white solids. The baked dough bread roll product exhibits resistance to moisture and texture degradation during storage at refrigerated temperatures within a hermetically sealed package, gas-flushed environment.

7 Claims, 3 Drawing Sheets

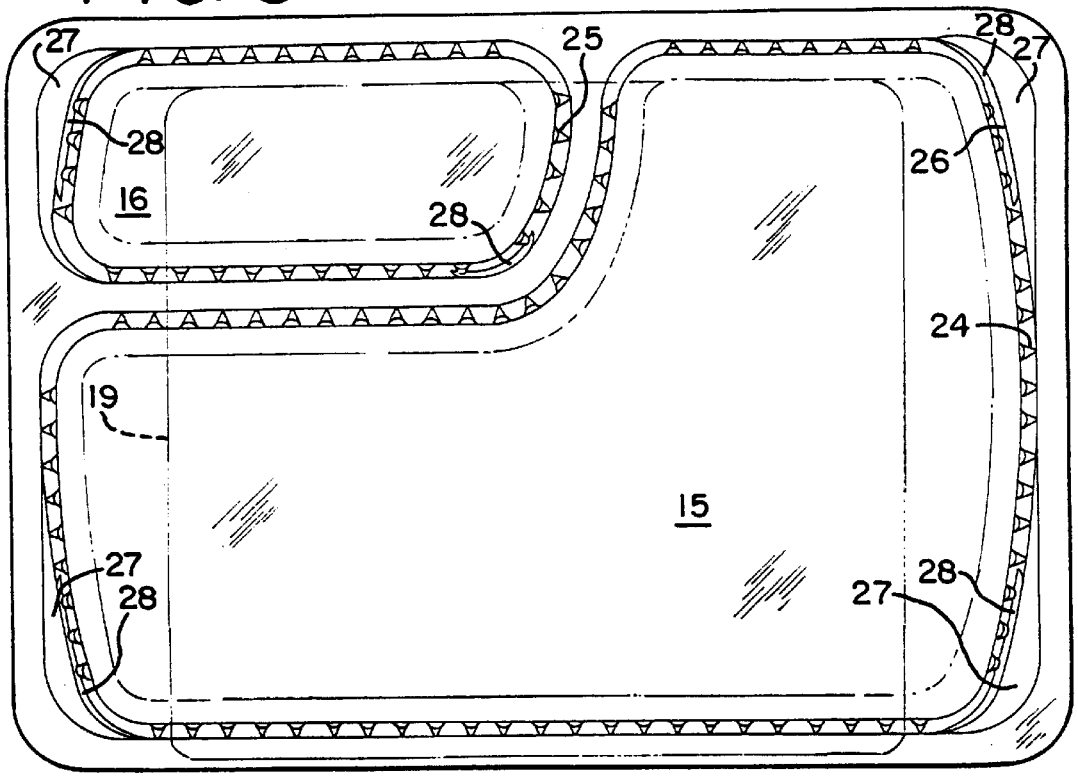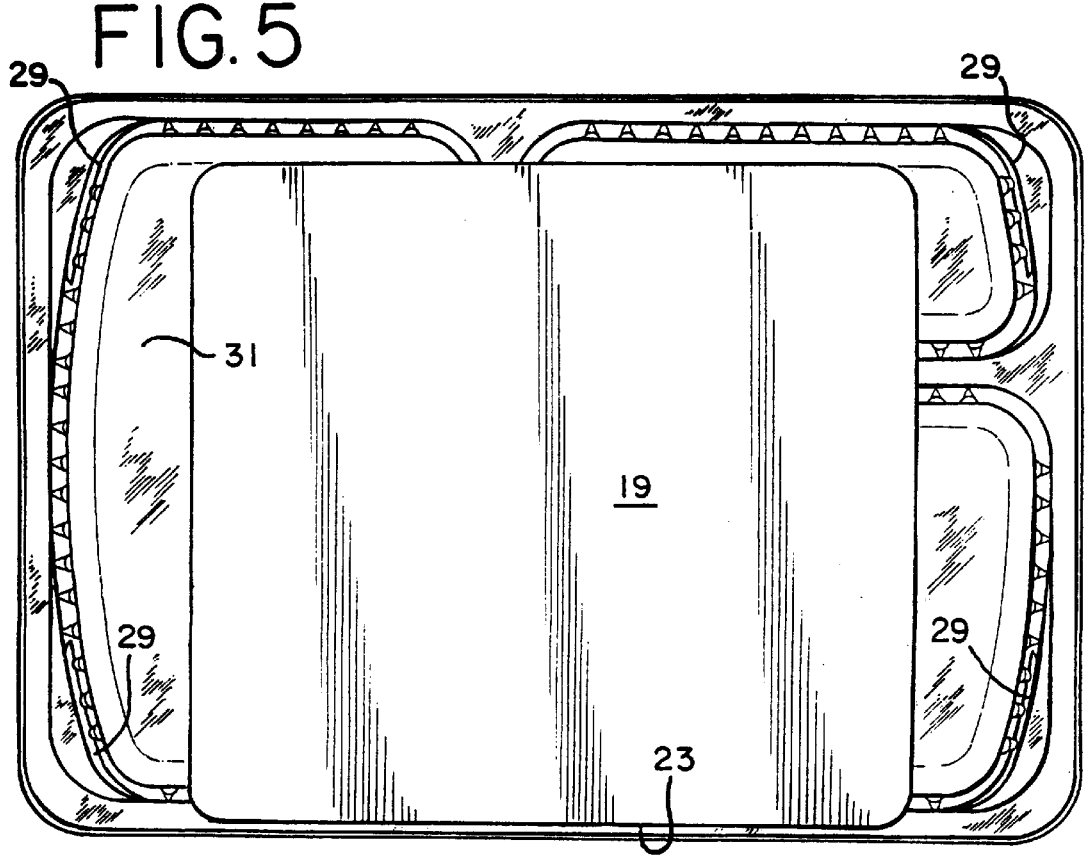

METHOD OF IMPARTING RESISTANCE TO MOISTURE AND TEXTURE DEGRADATION TO A BAKED PRODUCT

DESCRIPTION

BACKGROUND AND DESCRIPTION OF THE INVENTION

This invention generally relates to a refrigerated, packaged meal which includes a baked dough component. More particularly, the invention relates to meal components packaged together in a kit-like collection wherein at least some of the components will be assembled by the user after the kit or package is opened to remove these contents from the package. Baked dough components are incorporated which exhibit resistance to external, environmental or ambient moisture and texture degradation during storage under refrigeration while within the hermetically sealed, gas-flushed package. Various food packages are known which contain food in a form which is visible to the purchasing consumer. Included are packaged food products which require a minimum amount of consumer preparation and are quick to assemble into a snack or meal which combines a variety of tastes into one unit, such as sandwiches which incorporate a baked grain-based component and other component(s) providing a source of meat or dairy protein, such as carved, cubed, shredded or sliced meats, cheeses, spreads and the like. One such type of package has a rigid base tray having food-receiving compartments and a transparent flexible film cover which hermetically seals the compartments. A particular example in this regard is exemplified by U.S. Pat. No. 5,375,701, which is incorporated by reference hereinto.

Typically, these types of products are intended to be sold in retail facilities under customary refrigerated conditions. This means that all of the components within the sealed package or kit must be suitable for being refrigerated for extended time periods during storage, transportation, retail display and temporary refrigerated storage by the consumer. This requirement can be particularly problematic for any baked dough or grain-based component.

In the past, these types of sealed-package refrigerated products typically incorporate baked grain or dough components which normally have substantially low moisture levels. These tend to be in the nature of crackers or similar low-moisture types of products. Once a baked component, such as a bread or a roll, is held under refrigerated conditions for several days or more, it tends to undergo retrogradation and stale out, typically toughening or becoming leathery or dry and developing off odors and flavors. Chewing becomes more difficult, and the baked product loses some of its chewability. Generally speaking, refrigeration at non-freezing temperatures negatively impacts upon the taste of a baked grain or flour product, such as a bread component in the general form of a roll. While freezing baked dough products for reasonable lengths of time actually maintains adequate freshness, refrigeration at above-freezing temperatures of typical baked grain or dough products or breads or rolls is detrimental to the desired moisture, flavor, aroma, firmness and texture of that product.

Products of the type discussed herein incorporate components that must be kept refrigerated and should not be frozen. A suitable approach for maintaining the proper freshness and taste requires that each component, both individually and when packaged with other components, be capable of storage under such refrigerated conditions without any detrimental effects. In this regard, consideration is to be given to migration of moisture, aromas and flavors among the various components, as well as any other negative impact of refrigeration upon the individual components due to non-freezing refrigerated conditions for extended time periods of several weeks.

In accordance with the present invention, it has been determined that a unitary package or kit which is a refrigerated, packaged meal can be provided by combining various components of food and packaging to provide a compact, easily transportable sealed package or component kit which includes a compartmentalized hermetically sealed package having a plurality of components hermetically sealed from each other and from the environment. This package contains multiple components which are particularly well-suited for refrigerated storage under the conditions of hermetically sealed packaging. The food components include a refrigerated baked dough component such as a sandwich roll or bagel that exhibits resistance to ambient moisture and to texture, flavor, aroma and microbial degradation during refrigerated storage.

It is accordingly a general object of the present invention to provide an improved refrigerated, packaged meal which can be stored under refrigerated conditions for commercially useful lengths of time.

Another object of this invention is to provide an improved packaged meal product which includes a baked dough component which is formulated to exhibit resistance to moisture and to texture, flavor, aroma and microbial degradation during storage at refrigerated temperatures within a hermetically sealed, gas-flushed environment.

Another object of the present invention is to provide an improved refrigerated, packaged meal which incorporates a plurality of edible components for a meal and which includes components to be assembled in sandwich fashion between a specially formulated baked dough component.

Another object of the present invention is to provide an improved refrigerated, packaged meal in ready-to-assemble form, certain components forming a sandwich-type product which can be consumed in a refrigerated or heated condition, as well as at room temperature if desired.

Another object of this invention is to provide an improved product in which multiple components are in separate modified-atmosphere compartments for eliminating or retarding flavor, odor, moisture and microbiological migration.

These and other objects, features and advantages of the present invention will be apparent from and clearly understood through a consideration of the following detailed description.

BRIEF DESCRIPTION OF THE DRAWINGS

In the course of this description, reference will be made to the attached drawings, wherein:

FIG. 3 is a top plan view of the package shown in FIG. 1, but with the food components being removed therefrom;

FIG. 5 is a bottom plan view of the package shown in FIG. 3.

DETAILED DESCRIPTION OF THE INVENTION

A packaged meal in accordance with the present invention, generally designated as 11, is illustrated in FIG.

1. Included is a generally rigid base tray 12. An oxygen-barrier flexible film cover 13 is shown hermetically sealed along a peripheral flange 14 of the rigid base tray 12. Various food components are hermetically sealed within compartments defined by the base tray 12 and the film cover 13.

Figure 2:
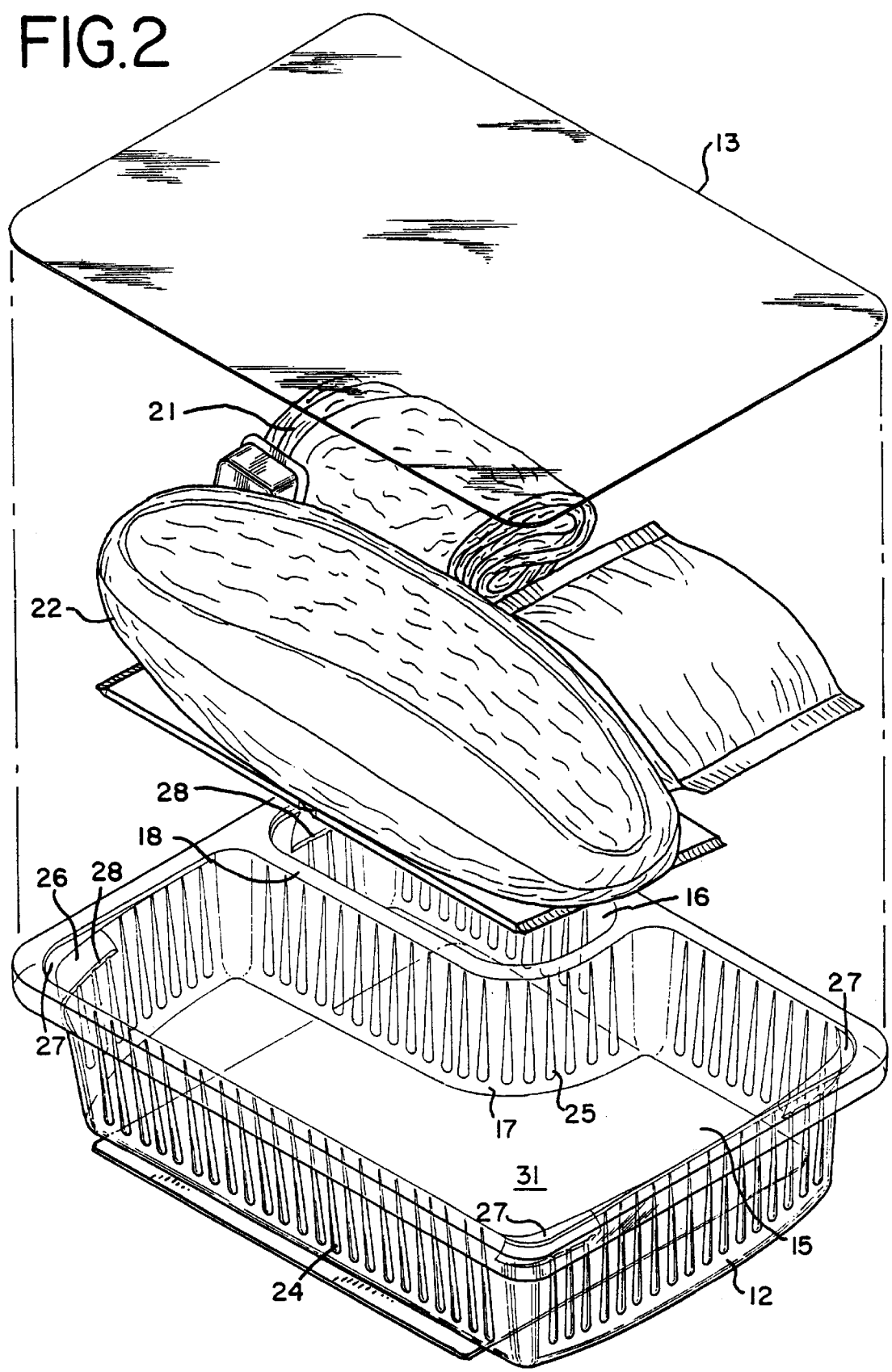
FIG. 2 is an exploded perspective view of the packaged meal shown in FIG. 1.

Further details of the packaged meal 11 are evident from FIG. 2. Rigid base tray 12 includes a plurality of compartments. Large compartment 15 and a smaller compartment 16 are shown in the illustrated embodiment. An internal component wall 17 helps to define these compartments. Wall 17 includes an internal flange 18 which is preferably continuous with the peripheral flange 14 as illustrated. It will thus be appreciated that the flexible film cover 13 overlies and is sealed to the peripheral flange 14 and to the internal flange 18. This seals the respective compartments on an individual basis in that each such compartment is hermetically isolated from the other compartments, as well as from the environment. A back panel 19 is also shown.

Figure 1:
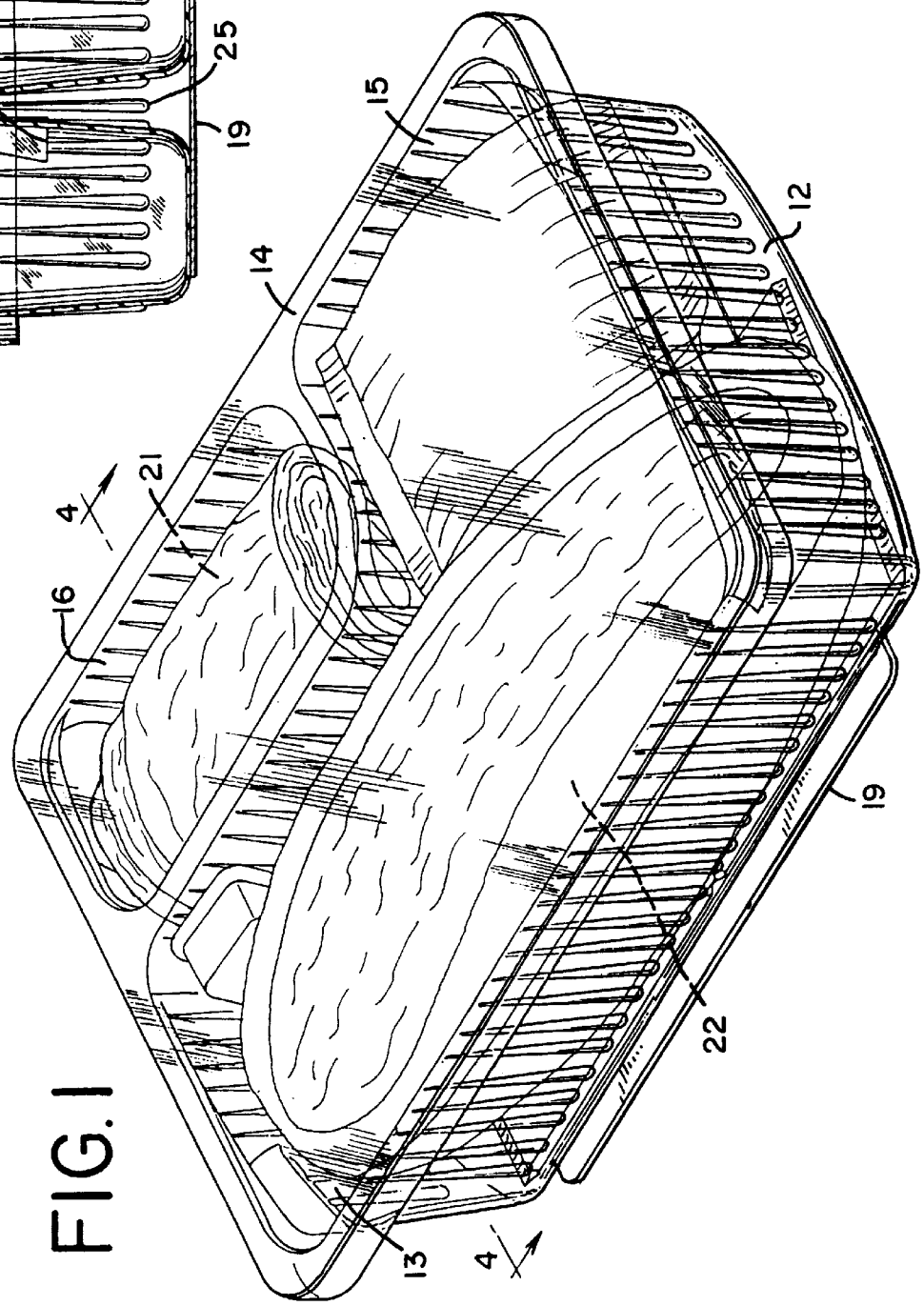
FIG. 1 is a perspective view of a packaged meal in accordance with the invention.

A meat component 21 is illustrated in FIG. 1 positioned within the smaller compartment 16. A baked dough component 22 is illustrated positioned within the large compartment 15. Large compartment 15 is also illustrated as containing other food components. They can include other sandwich-making components and side components such as dessert items and the like. While the side items and other sandwich components will typically be individually wrapped, in the illustrated embodiment, the baked dough component 22 is not individually wrapped. It is nevertheless hermetically sealed within the large compartment 15, separate and apart from the atmosphere and smaller compartment 16.

With more particular reference to the flexible film cover 13, same is preferably made of a transparent, flexible film or sheet material which can be printed upon as desired. This film cover is airtightly sealed to the periphery and flanges of the base tray 12. Sealing can be by heat sealing, suitable adhesives and the like. During the course of the sealing operation, the package as sealed is gas-flushed in accordance with generally known techniques. Various ones of the components, especially the side components, will be separately packaged under gas-flushing or vacuum sealing conditions before being placed in the base tray.

Figure 4:
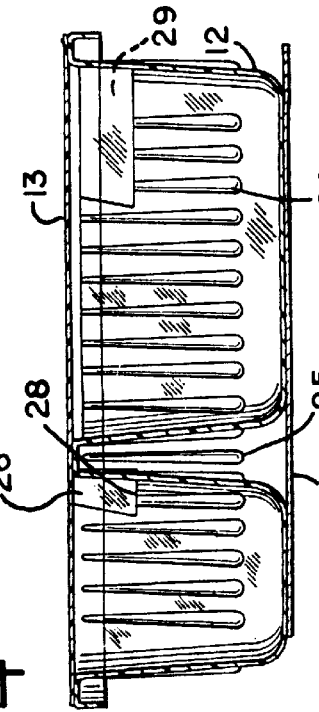
FIG. 4 is a cross-sectional view along the line 4—4 of FIG. 1.

Referring particularly to FIG. 4 and FIG. 5, the back panel 19 is a relatively stiff panel which preferably overlies at least a portion of both of the compartments and is adhered thereto by suitable means such as a hot melt adhesive. The lower edge 23 of this back panel is located along a line directly behind the outermost edge of the lowermost peripheral flange which is generally parallel to and most closely spaced from the lower edge 23. In this manner, the lower edge of the panel along with the other edge of the lowermost peripheral flange (as shown in FIG. 5) together provide a pair of parallel edges on which the package can stand with relative stability.

It is to be understood that the flexible film cover 13 can be used to provide labelling information and transparent areas for viewing of the food components and in accordance with various suitable arrangements. Typically it will be desired to have most, if not all, of the food components visible through transparent portions of the film cover which are between the labeling information areas. Labeling information can also be provided on the back panel.

Rigid base tray 12 includes vertical ribs 24. These assist in preventing buckling of the wall portions of the compartments 15 and 16, including their internal walls. See, for example, rib 25. This rib construction is especially useful in packages of the type discussed herein which have a larger depth than prior packages having similar constructions.

At certain locations, most notably in corner locations, the ribs are interrupted by a curved flattened surface 26. Surface 26 extends from a recessed top portion 27 and a curved ledge 28 which is generally parallel to the recessed top portion 27. This curved flattened surface 26 and curved ledge 28 combine to form an indent within the package and a corresponding detent 29 on the exterior of the rigid base tray. These detent structures avoid undue deflection of the rigid base tray and enhance buckling resistance. In the illustrated embodiment, the sidewalls of the rigid base tray 12 are offset by about 3° from true vertical, thereby providing a 3° taper generally between the peripheral flange 14 and the bottom wall 31 of the tray. The curved flattened surface 26 exhibits a 0° taper. This difference in taper angles facilitates the formation of the curved ledge 28.

With reference to materials out of which the packaging components may be made, the rigid base should be made of materials which, while exhibiting some degree of stiffness, are not too stiff so that they could be easily damaged or dented during handling. The materials also must satisfy a basic function of preserving the quality of the food products by minimizing any transference when in a hermetically sealed condition. High density polyethylene has been found to be suitable. Also, the base tray could be a protective multi-layer laminate. Examples include a three-layer laminate having inner and outer layers of low density polyethylene and an inner layer which enhances oxygen barrier characteristics. Ethylene vinyl alcohol or polyvinylidene chloride are suitable oxygen barrier materials. Ethylene vinyl acetate, for example, can also form the inner layer.

Concerning the flexible film cover 13, polyester materials can be especially useful because they are relatively strong and can accept ink or labels quite well. Multi-layer films are also possible, such as including an oxygen barrier middle layer including materials such as ethylene vinyl alcohol and polyvinylidene dichloride. A particularly useful interior layer is low density polyethylene which is heat sealable and provides a moisture barrier and can accept an antifogging ingredient to prevent fogging and the collection of droplets.

With reference to the materials for the back panel 19, same can be similar polymeric rigid materials, although there is no oxygen barrier requirement. Thus, same could be constructed of a relatively thick plastic material such as high density polyethylene or a paperboard material exhibiting adequate stiffness. Often, back panel 19 is most conveniently made of a paperboard material.

The baked dough component is specially formulated so as to maintain extended shelf-life when refrigerated and when within the hermetically sealed barrier package in accordance with the present invention. The dough components typically will take the form of a so-called submarine roll or hoagie roll, a soft bagel or the like. Details concerning certain bagel formulations are found in U.S. Pat. No. 5,409,717, the disclosure of which is incorporated by reference hereinto.

In accordance with the present invention, acceptable taste, texture and appearance properties are maintained in the baked dough component 22 for extended time periods. For example, these properties are maintained when the packaged product is stored under refrigerated conditions (at approximately 40° F. or about 4° C.) for several weeks. A typical range of refrigeration temperatures is between about 0° C. and about 10° C. In other words, the roll component or the like is especially formulated for extended refrigerated shelf life. The baked dough component is also of a type which will not be detrimentally affected during refrigerated distribution, storage and display under refrigerated conditions, and same is suitable for being consumed in an unheated or heated condition. One aspect of baked dough components in general is that refrigeration under non-freezing conditions can promote staleness, drying, and undesirable flavors, odors and coloration. For example, starch in baked dough components is known to "stale out" faster under such refrigerated conditions when compared with room temperature conditions, or for that matter frozen conditions. Stale products typically are drier to the taste than desired. Retrogradation of starch occurs more rapidly under refrigerated conditions, and the starch crystallizes into irreversible crystal form. A product that is much too firm and even gritty is a typical characteristic of a dough which has undergone such staling.

Formulations for making up the baked dough component are discussed herein in terms of so-called baker's percentages. These are weight percents based on the weight of flour used in a specific recipe, generally per 100 pounds of flour. For example, when 100 pounds of flour are used in a recipe, 57% water would mean the addition of 57 pounds of water to 100 pounds of flour. It should be noted that, when baker's percentages are used, the total percentages do not necessarily equal 100%.

A basic recipe (in baker's percentages) for baked dough components prepared according to the invention will be as follows: 100 pounds flour, 60–70% water, 1–5% shortening, 1–5% wheat gluten, 2–3% yeast, 0.1–0.5 starch-degrading enzyme, 0.1–0.4 gum and 0.5–2% egg white solids. Other ingredients can include 0.5–3% monoglycerides and/or mono- and di-glycerides, 0.5–12% corn syrup and the like, 0.2–0.8% vinegar, and other components for flavoring, coloring and/or texturizing the baked dough component.

In these formulations, the starch-degrading enzyme is preferably an exoamylase, such as α-amylase derived from various Bacillus strains. This component, together with other components, especially the gluten component, greatly contribute to the advantageous properties of the invention with respect to the baked dough component. Other ingredients important in this regard are the gum component and the egg white solids.

With further reference to the starch-degrading enzyme, preferred among the possible enzymes are the maltogenic enzymes which are resistant to inactivation by heat up to temperatures of at least about 82° C. One such enzyme is identified by the trademark NOVAMYL, a recombinant maltogenic amylase having an exemplified activity of 1500 MANU/g. An example is Novo Nordisk 1500 mg.

Typically, the dough is processed in stages. One component is allowed to ferment, such as for from four to six hours for a sponge formulation for a multigrain formula and a French sour starter for a sourdough formula. Such is combined with the rest of the dough formulation at an appropriate time and under appropriate conditions as is generally known in the art. Typically, the dough is held under conditions of temperature and humidity for a time effective to develop the dough as indicated by the evolution of carbon dioxide and the degradation of at least a portion of the starch in the flour to oligo saccharides. Forming and baking of the dough then follows, after which the resulting baked dough component is ready to be included in the packaged meal as discussed herein, either promptly or after storage under frozen conditions, depending upon the particular manufacturing needs at the time.

The types of enzymes discussed herein hydrolyse the non-reducing terminal chain lengths of starches and other polysaccharides by cleaving mono- and oligo-saccharide units at the (1—4) α-glucosidic linkages. It is preferred to employ greater-than-normal quantities of monoglycerides and/or mono- and di-glycerides in combination with the enzyme. The glycerides are useful in providing additional water binding in the crumb. Preferred levels of these water binders can be between about 0.5 to about 1.5%.

In addition to the starch-degrading enzyme, it has been found that other formula modifications are useful. For example, the inclusion of gluten, preferably as vital wheat gluten, can provide beneficial effects with respect to shelf life and retarding staleness. The preferred compositions will contain from about 1 to about 2% added gluten. Further, in this regard, it has been found that it is advantageous to include from about 1 to about 2% (solids basis) of at least one egg component selected from the group consisting of egg white, egg yolk, whole egg or a mixture of any of these in either fresh or dried form. Egg white, in particular, can be useful in providing tolerance in proof time. In addition to these structural components, gums such as vegetable gums like guar and xanthan, alone or in combination, can be effective in improving the long-term texture of the crumb.

EXAMPLE 1

A baked dough component taking the form of a sourdough sub roll was prepared in a two-component formula. One component was a French sour starter including (in baker's percentage) 2.5% clear flour, 1.35% water and 0.67% starter. This proceeded through a six hour fermentation. At the appropriate time, same was combined with the rest of the sourdough formula including 100% flour, 2.28% vital wheat gluten, 2.5% yeast, 1.7% salt, 1.05% mono- and di-glycerides, 0.48% calcium propionate anti-microbial agent, 0.48% of 200 grain vinegar, 1.50% shortening, 0.75% corn syrup, 63.85% water, 0.67% of the French sour starter, 1.05% egg white solids, 0.32% Novo Nordisk 1500 mg NOVAMYL enzyme and 0.22% guar gum. Mixing and combining was conducted in accordance with normal procedures. Sub roll-shaped preforms were proofed as required and baked.

Resulting baked sub rolls are incorporated into a packaged meal as shown in FIGS. 1 and 2, being gas-flushed and hermetically sealed as described. In a specific packaged meal kit, a thus baked sub roll (approximately 6 inches in length) is inserted into the large compartment of the rigid base tray, together with wrapped components including fat free sharp cheddar cheese, honey dijon spread and reduced fat cream sandwich cookies. Fat free oven roasted and smoked turkey is hermetically sealed within the smaller compartment of the rigid base tray. The kit was refrigerated at 40° F. for storage and consumption at approximately this temperature or higher.

EXAMPLE 2

A multigrain dough formula was used to make hoagie rolls, each being about six inches in length. The sponge component, which was subjected to four hours of fermentation, included 50% flour, 40.25% water, 13% nine grain mix, 2.54% yeast, 1.5% vital wheat gluten, 1.05% monoglycerides and 0.5% yeast food. Under appropriate timing, temperature and environment conditions, the sponge was combined with a dough formulation of 50% flour, 23% water, 10.5% high fructose corn syrup, 3% shortening, 2% nonfat dry milk, 0.5% 200 grain vinegar, 1.05% egg white solids, 0.32% NOVAMYL enzyme, 0.22% guar gum and flavoring and consistency modifiers. After suitable baking, a multigrain hoagie roll is combined into a packaged meal kit as described in Example 1.

Another multigrain hoagie roll is included in a kit which also includes smoked cooked ham and oven roasted turkey in the smaller compartment, with cheddar cheese, light mayonnaise and chocolate chip cookies being packaged with a hoagie roll in the large compartment. Evacuation and gas flushing and hermetic sealing are carried out.

In another kit, one of the six inch rolls is packaged in a large compartment with Swiss cheese, light mayonnaise and a brownie, while smoked turkey and oven roasted chicken are hermetically sealed within the packaged kit as discussed.

Each kit is refrigerated at 40° F. for subsequent distribution, retail display and use at approximately this temperature.

EXAMPLE 3

Bagels are prepared from a formulation including 96 parts flour, 6 parts high fructose corn syrup, 2 parts salt, 1 part mono- and di-glycerides, 1 part amylase enzyme, 1 part vital wheat gluten, 0.28 parts xanthan gum, 1 part egg whites, 1.4 part yeast, and water. After forming into bagel-shaped preforms and proofed at 32° C. and 87% relative humidity for thirty minutes, the preforms are boiled for about 40 seconds, followed by baking and cooling.

The resulting soft bagel is made into a packaged meal kit as follows. The soft bagel, fat-free sharp cheddar cheese, fat-free mayonnaise and chocolate pudding are packaged in the large compartment, and smoked turkey is packaged in the smaller compartment, followed by evacuation, gas-flushing and hermetic sealing as described in connection with FIG. 1 and FIG. 2.

Another kit is prepared with oven roasted chicken slices in the smaller compartment, with the larger compartment having a soft bagel, sharp cheddar cheese, honey dijon spread and mini-pretzels.

In another kit, smoked cooked ham is hermetically sealed in a smaller compartment, while hermetically sealed within the larger compartment are the soft bagel, Swiss cheese, dijon mustard and packaged apple sauce.

EXAMPLE 4

A sub roll made generally in accordance with Example 1, but formulated as a white bread product and without including any diglycerides was initially stored at 0° F. and then was repackaged in a barrier film with a modified atmosphere of nitrogen gas and carbon dioxide gas at a 75:25 ratio. This was moved to refrigeration at 40° F. and stored for 69 days at that temperature. A taste panel test was conducted. Not more than 15 minutes prior to being served, the sub roll was sliced and made into a sandwich with light mayonnaise, 1 ounce of turkey slices, 1 ounce of chicken slices, and 1 cheese slice. Each panelist received a full sub sandwich and a brownie dessert item. An affective test was then conducted as follows. The panelists were first asked to taste the sample and rate overall liking for the entire sandwich. Each was then asked to taste the bread only and rate bread liking, and taste the dessert only and rate dessert liking. Samples were rated using a balanced 7-point hedonic scale. Means and standard deviations were calculated from the data, and frequency score distributions were tabulated. Liking scores from this affective testing are shown in Table I.

TABLE I

| DEGREE OF LIKING | Sandwich Liking | Bread Liking | Brownie Liking |
|---|---|---|---|
| Percentage of responses:[1] | | | |
| Like very much = 7 | 24% | 30% | 14% |
| Like moderately = 6 | 32% | 28% | 28% |
|  | 56% | 58% | 42% |
| Like slightly = 5 | 27% | 18% | 28% |
| Neither like/dislike = 4 | 8% | 7% | 10 |
| Dislike slightly = 3 | 5% | 12% | 11% |
| Dislike moderately = 2 | 4% | 5% | 7% |
| Dislike very much = 1 | — | — | — |
| Mean Scores: (Standard deviations): | 5.48 (1.31) | 5.40 (1.54) | 4.95 (1.55) |

[1]Based on 97 respondents

The overall liking mean score of 5.48 indicated slight-to-moderate consumer liking for the entire sandwich. The mean score of 5.40 for bread liking indicated slight-to-moderate consumer liking for the baked sub roll component of the sandwich, even after its 69-day storage under refrigerated conditions. This was judged to be a good score for a bread item which had been stored under refrigeration for this long a time period. The mean score of 4.95 for dessert liking indicated slight consumer liking for the brownie.

EXAMPLE 5

A baked dough component taking the form of a bagel was included in affective sensory evaluation. Bagels formulated in accordance with Example 3 were stored for 80 days in oxygen-barrier packages at 40° F. gas flushed with nitrogen gas and carbon dioxide gas. Sandwiches were made with sliced turkey (1.6 ounce) and a cheese slice (1 ounce). Each sensory evaluation panelist was given a full sandwich. Each was first asked to taste the sample and rate overall liking for the entire sandwich. Each panelist was then asked to rate bagel liking, meat liking and cheese liking. Samples were rated using a balanced 7-point hedonic scale. Means and standard deviations were calculated from the data, and frequency score distributions were tabulated. Liking scores from this affective testing are indicated in Table II.

TABLE II

| DEGREE OF LIKING | Sandwich Liking | Bagel Liking | Meat Liking | Cheese Liking |
|---|---|---|---|---|
| Percentage of responses:[1] | | | | |
| Like very much = 7 | 50% | 49% | 53% | 29% |
| Like moderately = 6 | 38% | 31% | 34% | 38% |
|  | 88% | 80% | 87% | 67% |
| Like slightly = 5 | 9% | 13% | 9% | 14% |
| Neither like/ | 1% | 1% | 4% | 13% |

TABLE II-continued

| DEGREE OF LIKING | Sandwich Liking | Bagel Liking | Meat Liking | Cheese Liking |
|---|---|---|---|---|
| dislike = 4 Dislike slightly = 3 | 2% | 4% | — | 3% |
| Dislike moderately = 2 | — | 2% | — | 1% |
| Dislike very much = 1 | — | — | — | 2% |
| Mean Scores: (Standard deviations): | 6.32 (0.84) | 6.14 (1.14) | 6.37 (0.80) | 5.66 (1.32) |

[1]Based on 105 respondents

Overall liking, bagel liking and meat liking mean scores were all greater than 6, indicating a high consumer liking for the full sandwich and for the stored, refrigerated bagel itself.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A method of imparting resistance to moisture and texture degradation in a bread roll during periods of extended storage at refrigerated temperatures, comprising:

preparing a baked dough bread roll formulated from a dough including a starch-degrading bacterially derived amylase enzyme;

hermetically sealing said baked dough bread roll with said enzyme therein in a package; and refrigerating said package with said baked dough bread roll therein at temperature of between about 0° C. and about 10° C. for a time period required for retail distribution, display and sale of said baked dough bread roll.

2. The method of claim 1, wherein said baked dough bread roll is hermetically sealed in said package with an oxygen-barrier flexible film.

3. The method of claim 1, wherein said package also includes a refrigerated meat meal therein.

4. The method of claim 1, wherein said baked dough bread roll further includes an added gluten component.

5. The method of claim 1, wherein said baked dough bread roll further includes an added gluten component, a gum component and an egg component.

6. The method of claim 1, including gas flushing said hermetically sealed package.

7. The method of claim 1, wherein said baked dough bread roll also includes flour, water and an edible oil.

* * * * *